(12) United States Patent
Hough

(10) Patent No.: US 7,146,291 B2
(45) Date of Patent: Dec. 5, 2006

(54) METHOD OF GENERATING AN INSPECTION PROGRAM AND METHOD OF GENERATING A VISUAL DISPLAY

(75) Inventor: Gerald W. Hough, Alvaston (GB)

(73) Assignee: Rolls-Royce plc, London (GB)

( * ) Notice: Subject to any disclaimer, the term of this patent is extended or adjusted under 35 U.S.C. 154(b) by 50 days.

(21) Appl. No.: 10/986,380

(22) Filed: Nov. 12, 2004

(65) Prior Publication Data
US 2005/0171733 A1    Aug. 4, 2005

Related U.S. Application Data

(63) Continuation of application No. PCT/GB03/01893, filed on May 14, 2003.

(51) Int. Cl.
*G05B 19/19*    (2006.01)

(52) U.S. Cl. ............. 702/182; 702/155; 702/168; 702/188; 700/174; 700/182; 700/195

(58) Field of Classification Search ............... None
See application file for complete search history.

(56) References Cited

U.S. PATENT DOCUMENTS

| | | | |
|---|---|---|---|
| 4,901,253 A | | 2/1990 | Iwano et al. |
| 4,974,165 A | * | 11/1990 | Locke et al. ............. 700/193 |
| 5,257,204 A | * | 10/1993 | Sawada et al. ............. 700/182 |
| 5,471,406 A | * | 11/1995 | Breyer et al. ............. 702/168 |
| 5,636,026 A | * | 6/1997 | Mian et al. ............. 356/602 |
| 5,726,917 A | * | 3/1998 | Staaden ............. 702/168 |
| 5,796,619 A | * | 8/1998 | Wampler ............. 700/195 |
| 5,898,590 A | * | 4/1999 | Wampler et al. ............. 700/174 |
| 5,991,703 A | * | 11/1999 | Kase ............. 702/167 |
| 6,009,381 A | * | 12/1999 | Ono ............. 702/188 |
| 6,175,415 B1 | * | 1/2001 | Pietrzak et al. ............. 356/602 |
| 6,205,240 B1 | * | 3/2001 | Pietrzak et al. ............. 382/152 |
| 6,879,933 B1 | * | 4/2005 | Steffey et al. ............. 702/155 |
| 2003/0125901 A1 | * | 7/2003 | Steffey et al. ............. 702/155 |
| 2005/0281453 A1 | * | 12/2005 | Boyer ............. 382/141 |

FOREIGN PATENT DOCUMENTS

| | | |
|---|---|---|
| GB | 2230364 A | 10/1990 |
| JP | 0829152 A | 2/1996 |

* cited by examiner

*Primary Examiner*—Carol S. W. Tsai
(74) *Attorney, Agent, or Firm*—W. Warren Taltavull; Manelli Dension & Selter PLLC

(57) ABSTRACT

A computer-implemented method of generating an inspection program for a computer-controlled coordinate measuring probe comprises the steps of:
(a) receiving nominal geometry data for a component,
(b) receiving inspection requirement data specifying one or more selected shape characteristics of the component,
(c) determining from the nominal geometry data and the inspection requirement data an inspection path for a computer-controlled coordinate measuring probe, the inspection path enabling the measuring probe to measure actual component coordinates associated with the selected shape characteristics, and
(d) generating an inspection program for moving the computer-controlled coordinate measuring probe along the inspection path.

16 Claims, 10 Drawing Sheets

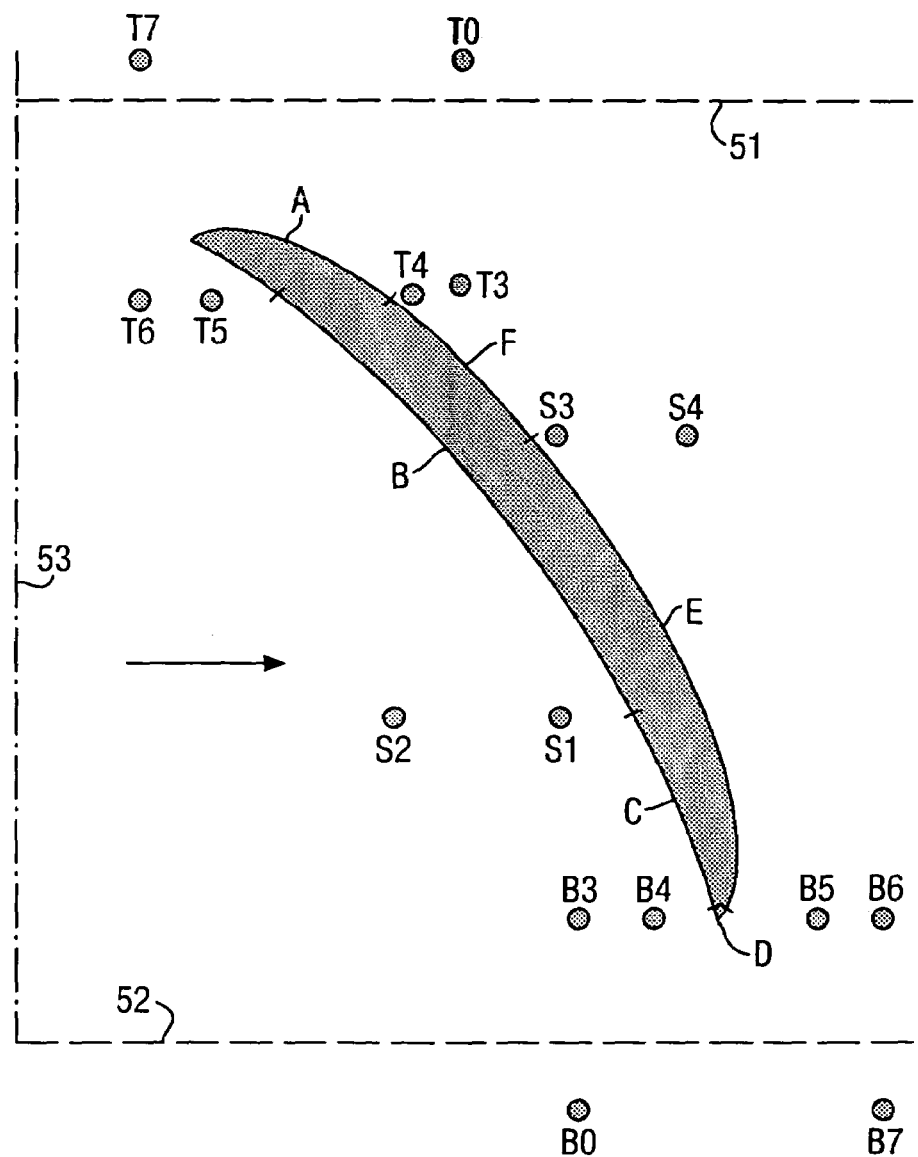

101
102

111 Acquire inner and outer tolerance limits and actual profile

112 Superimpose tolerance limits and actual profile

113 Scale tolerance limits and actual profile

114 Generate visual display of superimposed and scaled tolerance limits and actual profile

METHOD OF GENERATING AN INSPECTION PROGRAM AND METHOD OF GENERATING A VISUAL DISPLAY

This is a continuation of PCT/GB2003/001893 filed May 14, 2003

FIELD OF THE INVENTION

The present invention relates to a method of generating an inspection program, a method of inspecting a component, a method of generating a visual display, and a method of determining whether a component conforms to tolerances.

BACKGROUND OF THE INVENTION

Manufactured components often have to conform to dimensional and/or geometrical tolerances. These mat be specified by the manufacturer or ultimate user of the component e.g. to ensure that the component behaves correctly in service. Thus it is common to subject components to post-manufacture inspection procedures.

A known technique for determining the dimensional accuracy of components involves driving a computer-controlled coordinate measuring probe or stylus over the surface of he component. Such a probe typically comprises a stiff elongate member (formed e.g. of carbon fibre) having a small hard (typically industrial ruby) sphere at the measuring end. An example of a commercially available probe is the Renishaw SP600™ analogue scanning probe. The probe is fitted to a quill (providing z-direction movement), which in turn is mounted to a carriage assembly (providing x- and y-direction movement), and the component mounted on a measuring table, whereby the movements of both the probe and the component can be controlled via a programmable coordinate measuring machine (CMM).

Sensing means associated with the probe detects when and where the sphere contacts a surface and the CMM translates that information into a spatial coordinate for the surface contact point with the sphere. Thus by making contact with the component at spaced apart points along a programmed guide path, the probe can provide discrete measurements of the relative positions of these points. In this way, shape characteristics (such as profiles or outlines) of the actual component can be built up, and these characteristics can then be compared for conformity with e.g. predetermined tolerance limits.

Conventionally, the operator programs a guide path by a teach-and-learn technique in which he drives the probe under manual control to specific points along the desired guide path, and saves the oppositions of those points in the memory of the CMM. When performing a measurement run, the CMM subsequently drives the probe from point-to-point in an order determined by the operator, taking measurements along the way. In defining the guide path, the operator will also specify approach directions and probe angles to ensure that the probe or quill does not collide with the component. As and when necessary, the operator may also program the quill to change the probe (usually at a probe change station remote from the component) so that e.g. a probe with a longer elongate member is used to reach otherwise-inaccessible parts of the component.

Gas turbine engine components, and particularly critical components such as blades, vanes and discs, are commonly inspected using such techniques. For example, blades usually have complex aerofoil shapes and may need to be characterised at a plurality of different sections. Conventionally an inspection probe operator will separately program the inspection path for each section. With a stand-alone blade a typical inspection path may consist of a simple continuous circumnavigation or the blade.

A problem can arise, however, when the component under inspection has a more complex shape. For example, a gas turbine blisk (bladed disk) comprises a central disk or ring with a plurality of angularly spaced blades or vanes extending radially therefrom. It is often not possible for the probe to follow uninterrupted inspection paths on a blisk because the tight angular packing of the blades forces the operator to access different surface positions from different sides of the blisk. Hence a probe inspection path for a blisk typically consists of discrete sub-paths. At the end of a sub-path, the probe may be moved away from the component and reorientated before reengaging with the component from a different direction to start the next sub-path. The probe length may also be changed between sub-paths.

Thus the amount of time an operator needs to program and fully inspect the disk and all the blades on a blisk using conventional procedures can be significantly greater than the time required to program and inspect a stand-alone blade multiplied by the number of blades. Indeed the amount of time can result in conventional inspection becoming economically unviable.

SUMMARY OF THE INVENTION

An object of the present invention, therefore, is to reduce the amount of time needed to specify a probe inspection path.

The present invention is at least partly based on the recognition that the nominal component geometry can be used to automatically specify an inspection path to measure the actual component geometry.

In a first aspect the present invention provides a computer-implemented method of generating an inspection program for a computer-controlled coordinate measuring probe, the method comprising the steps of:

(a) receiving nominal geometry data for a component, (b) receiving inspection requirement data specifying one or more selected shape charateristics of the component, (c) determining from the nominal geometry data and the inspection requirement data an inspection path for a computer-controlled coordinate measuring probe, the inspection path enabling the measuring probe to measure actual component coordinates associated with the selected shape characteristics, and (d) generating an inspection program for moving the computer-controlled coordinate measuring probe along the inspection path.

Preferably the component is a blisk, although the component may be another gas turbine components such as a bling (bladed ring), a casing, a disk, a blade or a vane. However, the method may also be applied e.g. to automotive components or other manufactured parts. Furthermore, although the method can be advantageously applied to components have relatively complex shapes, the method may also be applied to simple components.

Advantageously, and in contrast to conventional teach-and-learn techniques, the program can be generated without physically contacting the probe to the component. Thus, in principle, the method allows the inspection path to be determined without reference to the actual component.

One example of a shape characteristic (hereafter termed a "plane section") is the outline or profile or a transverse cross section through a blade at a distance from the blade root (or, for a blisk blade, at a distance from the engine centre line), the plane of the cross section being perpendicular to the radial direction of the disk to which the blade is or is intended to be attached, and the distance from the blade root (or engine centre line) being specified by the inspection requirement data. A plane section typically has an aerofoil shape. Another example of a shape characteristic (hereafter termed a "longitudinal section") is the outline or profile of either the pressure or suction side of a blade (e.g. a blisk blade) on a longitudinal cross section through the blade at a distance from the blade stacking axis, the plane of the cross section being perpendicular to the axial direction (i.e. the engine centre line) of the disk to which the blade is or is intended to be attached, and the distance from the stacking axis being specified by the inspection requirement data. A further example of a shape characteristic (hereafter termed an "annular section") is the outline or profile of the radially outer surface of a disk (e.g. a blisk disk) on a longitudinal cross section containing the axis of the disk, the profile extending along the "valley bottom" formed by adjacent blades.

It is thus possible to associate with each selected shape characteristic a standard measuring probe inspection path (which may comprise a plurality of sub-paths, each having e.g. an initial probe stand off position, measurement start and finish positions, and a final probe stand off position). The nominal geometry data and the inspection requirement data determines the approximate dimensions of that path. However, by carefully defining the standard inspection path, the computer can ensure that the probe can access all points along the path without colliding with adjacent parts of the component.

Hence, when the inspection requirement data is received the computer can automatically determine an inspection path which allows the measuring probe to be driven over the component surface so that the actual component coordinates associated with all the selected shape characteristics can be measured.

Preferably, the inspection path is determined so as to minimise the number of (generally time-consuming) probe changes. For example, if a number of spaced plane sections are to be measured on a particular blade of a blisk, and the probe can only measure the flanks of each section by using a relatively long probe, but for measurement accuracy it is desirable to use a relatively short probe to measure the critical leading edge and trailing edge portions of the sections, the inspection path can be determined so that the flanks of all the sections are measured before any of the leading edge and trailing edge portions. Thus in this example only one probe change is required during the execution of the inspection path.

It is common to produce components such as blisks using CAD (computer-aided design) and/or CAM (computer-aided machining/manufacturing) procedures. Thus the nominal geometry data can conveniently be derived from CAD and/or CAM data.

Preferably, the method further comprises before step (c) the step of determining from the nominal geometry data at least one probe position (hereafter termed a "safe position") at which the probe can be reorientated without risk of collision with the component. This position may then be included in the inspection path if probe reorientation is required during component inspection.

For example, a virtual boundary may be defined relative to the component, wherein the probe is in a safe position whenever it is on the opposite side of the boundary to the component. In the case of a gas turbine disk (e.g. a blisk disk), such a boundary may conveniently be defined by a plane which is spaced from either the fluid inlet or fluid outlet face of the disk and which extends perpendicularly to the axis of the disk.

The inspection requirement data may further specify scan parameters such as the measurement point density along the inspection path for each selected shape characteristic and/or the probe type to be used for each selected shape characteristic. In this way the operator can influence the number and accuracy of the actual component coordinates which are measured when the computer-controlled coordinate measuring probe is moved along the inspection path under file control of the inspection program controls. Additionally or alternatively, default settings can be used for some or all or the scan parameters.

A further aspect of the invention provides computer readable program code for implementing the method of the first aspect of the invention.

A further aspect of the invention provides computer readable media carrying program code for implementing the method of the first aspect of the Invention.

For example, an article of manufacture may comprise computer readable media carrying program code for generating an inspection program or a computer-controlled coordinate measuring probe, whereby, in use, the program code controls the performance of the steps of:

(a) receiving nominal geometry data for a component, (b) receiving inspection requirement data specifying one or more selected shape characteristics of the component, (c) determining from the nominal geometry data and the inspection requirement data an inspection path for a computer-controlled coordinate measuring probe, the inspection path enabling the measuring probe to measure actual component coordinates associated with the selected shape characteristics, and (d) generating an inspection program for moving the computer-controlled coordinate measuring probe along the inspection path.

As used herein, "computer readable media" refers to any medium or media which can be read and accessed directly by a computer. Such media include, but are not limited to: magnetic storage media such as floppy discs, hard disc storage medium and magnetic tape; optical storage media such as optical discs or CD-ROM; electrical storage media such as RAM and ROM; and hybrids of these categories such as magnetic/optical storage media.

A further aspect of the invention provides a computer system for implementing the method of the first aspect of the invention.

For example, a computer system intended to generate an inspection program for a computer-controlled coordinate measuring probe may comprise:

a data storage device or devices for storing (a) nominal geometry data for a component, and (b) inspection requirement data specifying one or more selected shape characteristics of the component, and a processor for (a) determining from the nominal geometry data and the inspection requirement data an inspection path for a computer-controlled coordinate measuring probe, the inspection path enabling the measuring probe to measure actual component coordinates associated with the selected shape characteristics, and (b) generating an inspection program for moving the computer controlled coordinate measuring probe along the inspection path.

As used herein, "a computer system" refers to any hardware means, software means and data storage means used to perform a computer-implemented method of the present invention. The minimum hardware means of such a computer system typically comprises a central processing unit (CPU), input means, output means and data storage means. The data storage means may be RAM or means for accessing computer readable media. An example of such a such system is a microcomputer workstation available from e.g. Silicon Graphics Incorporated and Sun microsystems running Unix based, Windows NT or IBM OS/2 operating systems. A more preferred example, however, is a dedicated programmable CMM system. One such system is available from Brown & Sharpe and runs QUINDOS software. Similar systems are available from LK and Mitutoyo.

A further aspect of tire invention provides computer readable inspection program code generated by the first aspect of the invention.

A further aspect of the invention provides computer readable media carrying inspection program code generated by the first aspect of the invention.

A further aspect of the invention provides a method of inspecting a component with a coordinate measuring probe, the method comprising the steps of:

(a) receiving nominal geometry data for the component, (b) receiving inspection requirement data specifying one or more selected shape characteristics of the component, (c) determining from the nominal geometry data and the inspection requirement data an inspection path for the coordinate measuring probe, the inspection path enabling the measuring probe to measure actual component coordinates associated with the shape characteristics, and (d) inspecting the component by moving the coordinates measuring probe along the inspection path.

Any one or combination of the optional features of the first aspect of the invention may also apply to the further aspects of the invention discussed above.

A further general aspect of the invention relaxes to a method of generating a visual display for comparing an actual profile of a component with spaced inner and offer tolerance limits for the profile.

By the "inner tolerance limit" we mean the tolerance limit which is inside the body of the component and by the "outer tolerance limit" we mean the tolerance limit which is outside the body of the component when the actual surface profile of the component is in fact between the tolerance limits.

It is known to generate visual displays by scaling the tolerance limits and actual profile so that the spacing between the inner and outer tolerance limits is expanded relative to distances along which the actual profile extends, but the position of the actual profile relative to the spacing is preserved. Thus if a particular point on the actual profile touches or crosses the inner or outer tolerance limit, that point will still appear to touch or cross the tolerance limit on the superimposed and scaled visual display. An operator can thus readily determine from the visual display whether the actual profile is within the tolerance limits.

This is particularly useful when the spacing between the unscaled tolerance limits is relatively small in comparison to the length of the actual profile, such that in an unscaled visual display of the superimposed tolerance limits and profile the spacing would be close to or below the resolution limit of a display device or the human eye.

However, a problem can arise when the tolerance limits describe a loop around a component or a cavity within a component such that on scaling a portion of one of the tolerance limits crosses over with an opposing portion of the same tolerance limit. This distorts the original shape of the tolerance limit and makes it difficult for the operator to interpret correctly the visual display.

Consequently a further aspect of the present invention provides a method of generating a visual display for comparing an actual profile of a component with spaced inner and outer tolerance limits for the profile, the method comprising the steps of:

(a) superimposing the inner tolerance limit, the outer tolerance limit, and the actual profile, (b) scaling the tolerance limits and actual profile by displacing each point on one of the tolerance limits in a displacement direction away from the corresponding point on the other tolerance limit without displacing said corresponding point in the opposite direction, and furthermore displacing each point on the actual profile in said displacement direction, so that the spacing between the inner and outer tolerance limits is increased relative to distance along which the actual profile extends, but the position of the actual profile relative to said spacing is preserved, and (c) generating a visual display of the superimposed and scaled tolerance limits and actual profile.

Thus the method advantageously provides a visual display in which tolerance limit cross over can be avoided so that the superimposed and scaled tolerance limits and actual profile better preserve the original shape of the component. For example, in the case of the visual display of an aerofoil plane section, the inner tolerance limit for the section can prevented from being inwardly displaced on scaling, thereby avoiding cross over of those portions of the inner tolerance limit corresponding to the flanks of the aerofoil plane section.

The actual profile may be a selected shape characteristic with coordinates which were measured by performing the method of inspecting a component according to a previous aspect of the invention.

Further aspects of the invention provide computer program code for implementing the method of the previous aspect of the invention, computer readable media carrying program code for implementing the method of the previous aspect of the invention, and a computer system for implementing the method of the previous aspect of the invention.

For example, an article of manufacture may comprise computer readable media carrying program code for generating a visual display for comparing an actual profile of a component with spaced inner and outer tolerance limits for the profile, whereby, in use, the program code controls the performance of the steps of:

(a) superimposing the inner tolerance limit, the outer tolerance limit, and the actual profile, (b) scaling the tolerance limits and actual profile by displacing each point on one of the tolerance limits in a displacement direction away from the corresponding point on the other tolerance limit without displacing said corresponding point in the opposite direction, and furthermore displacing each point on the actual profile in said displacement direction, so that the spacing between the inner and outer tolerance limits is increased relative to distances along which the actual profile extends, but the position of the actual profile relative to said spacing is preserved, and (c) generating a visual display of the superimposed and scaled tolerance limits and actual profile.

A further example provides a system for generating a visual display which compares an actual profile of a component with spaced inner and outer tolerance limits for the profile, the system comprising:

a data storage device or devices for storing the inner tolerance limit, the outer tolerance limit, and the actual profile, a processor for (a) superimposing the inner tolerance limit, the other tolerance limit, and the actual profile, and (b) scaling the tolerance limits and actual profile by displacing each point on one of the tolerance limits in a displacement direction away from the corresponding point on the other tolerance limit without displacing said corresponding point in the opposite direction, and furthermore displacing each point on the actual profile in said displacing direction, so that the spacing between the inner and outer tolerance limits is increased relative to distances along which the actual profile extends, but the position of the actual profile relative to said spacing is preserved, and a visual display device for displaying the superimposed and scaled tolerance limits and actual profile.

The method may be implemented using a computer system, such as a CMM system, having an appropriate display device such as a VDU or a printer.

A further aspect of the invention provides a method of determining whether a component conforms to tolerances, the method comprising the steps of:

(a) providing an actual profile of a component, and spaced inner and outer tolerance limits for the profile (a) superimposing the inner tolerance limit, the outer tolerance limit, and the actual profile, (b) scaling the tolerance limits and actual profile by displacing each point on one of the tolerance limits in a displacement direction, so that the spacing between the inner and outer tolerance limits is increased relative to distances along which the actual profile extends, but the position of the actual profile relative to said spacing is preserved, (c) generating a visual display of the superimposed and scaled tolerance limits and actual profile, and (d) determining from the visual display whether the actual profile is between the inner and outer tolerance limits.

BRIEF DESCRIPTION OF THE DRAWINGS

The present invention will now be described in relation to a specific embodiment and with reference to the accompanying drawings, in which:

FIG. 7 shows schematically another plane section, FIG. 8 Shows schematically the leading edge portion of a plane section profile.

DETAILED DESCRIPTION OF THE INVENTION

Figure 1:
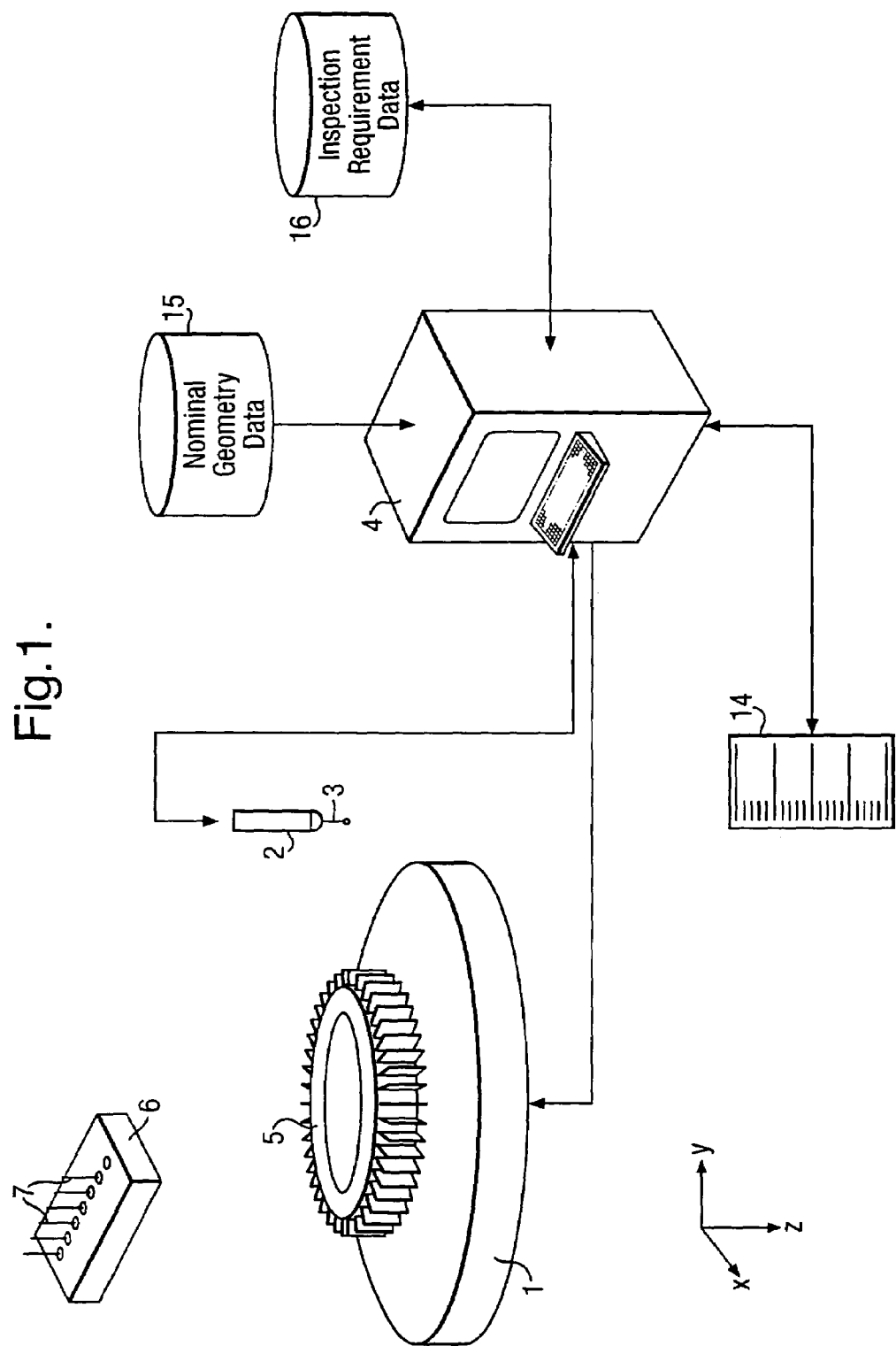
FIG. 1 shows a block diagram of a programmable CMM system for inspecting a component with a coordinate measuring probe.

FIG. 1 shows a block diagram of a programmable CMM system for inspecting a component with a coordinate measuring probe.

The CMM comprises a turntable 1, a quill 2 (providing z-direction movement) with a coordinate measuring probe 3 at the distal end, a carriage assembly (not shown) which moves the quill in the x- and y-directions, and a central programmable computer 4 (which takes the form of a command console) for controlling the turntable, Quill and measuring probe, and for receiving measurement signals from the probe. The component to be inspected, in this exemplary embodiment a blisk 5, is mounted on the turntable.

A probe change station 6 spaced from the turntable carries a plurality of alternative measuring probes 7 which can be interchangeably mounted at the end or the quill.

The measuring probe has a finger (formed e.g. of carbon fibre) which terminates at one end in a small hard industrial ruby sphere and at the other end joins to a connecting member which allows the probe to be connected to the end of the quill 2. The probe senses when a predetermined amount of over-travel has been reached after contact between the hard sphere and the surface of the component, and sends this information to the central computer where the signal is converted into a coordinate for the contact point.

The quill terminates in a joint to which the measuring probe is connected and which allows the probe to move two rotation axes at the end of the quill.

Figure 2:
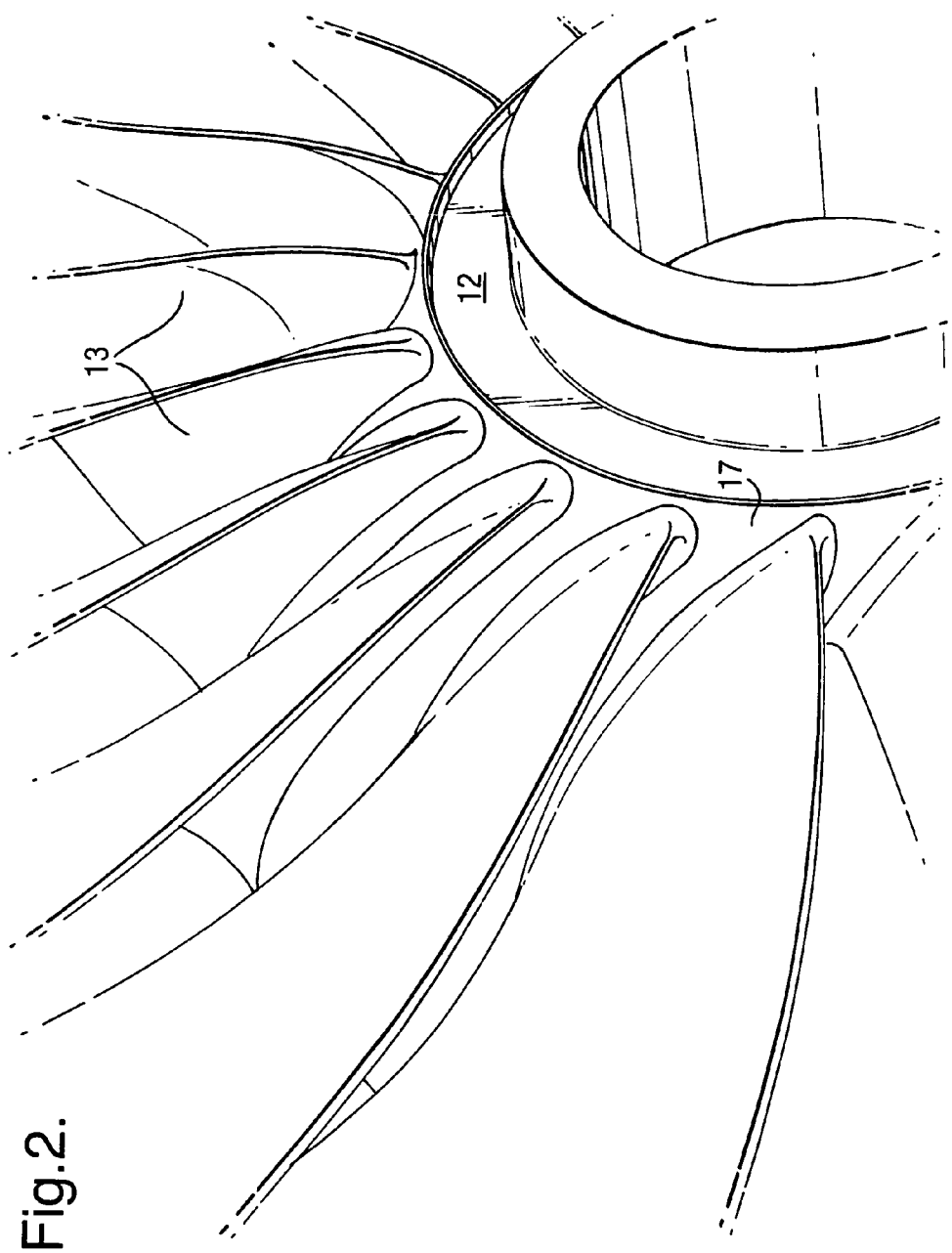
FIG. 2 shows a detail of a blisk.

FIG. 2 shows a detail of the blisk 5. The blisk is a one-piece machined component comprising a disk 12 and a plurality of circumferentially arranged blades 13 extending radially from the outer radial surface 17 of the disk. The spacing between adjacent blades is such that, when scanning the probe along a predetermined inspection path, it is often necessary to interrupt the scan, reorientated the probe, and reapproach the blisk from a different direction in order to continue the scan.

Figure 3:
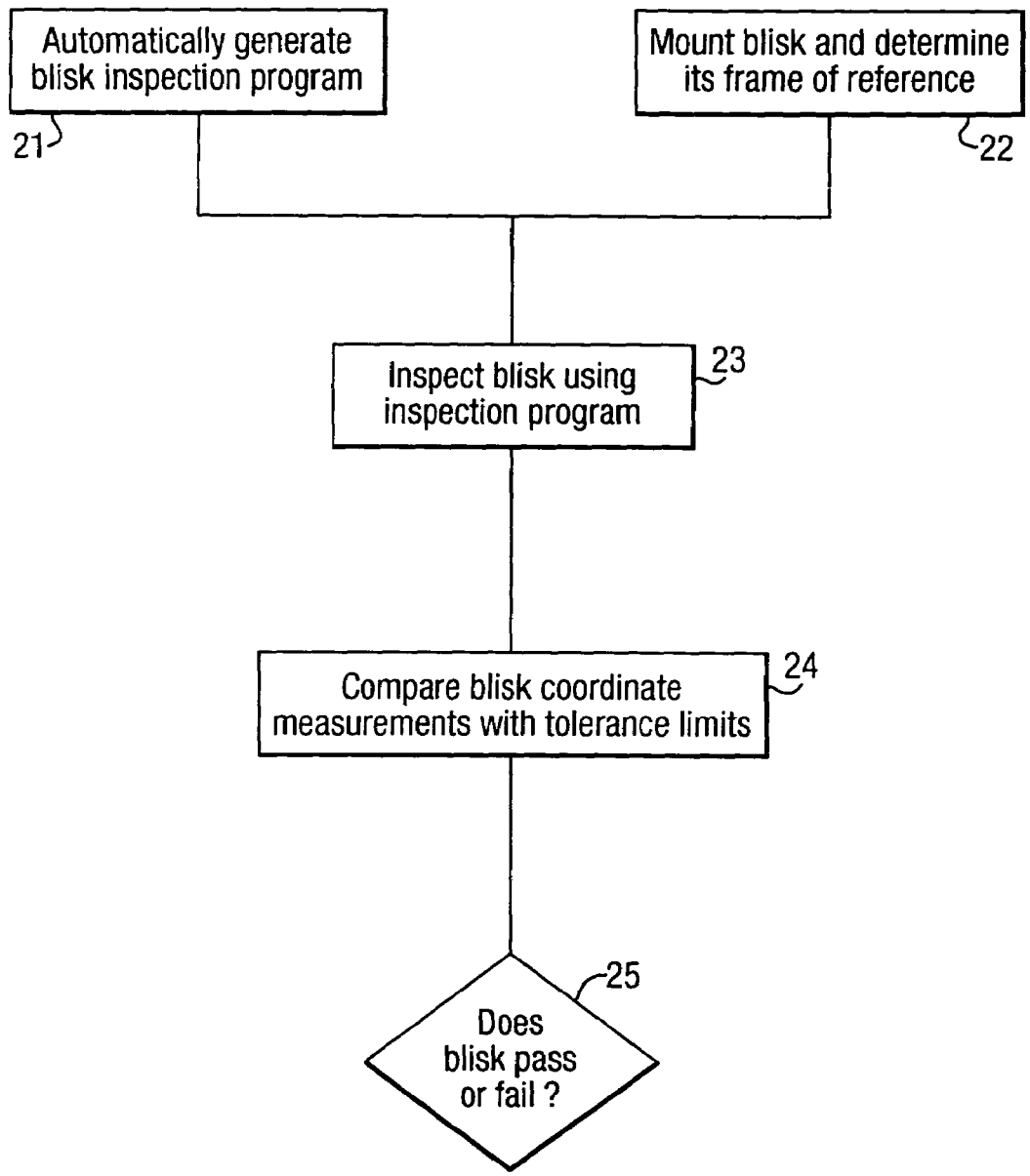
FIG. 3 is a flowchart of an exemplary process for determining whether a blisk conforms to requirements.

FIG. 3 is a flowchart of an exemplary process for determining whether the blisk conforms to requirements. Of course, the process may be applied to other components as well as blisks.

The first stage (at 21), which will be discussed in more detail below, is to automatically generate an inspection program for selected shape characteristics of the blisk. This stage is performed by the central computer 4 using nominal geometry data and inspection requirement data. FIG. 1 shows schematically the relation of the inspection program 14, nominal geometry data 15 and inspection requirement data 16 to the central computer. The nominal geometry data (which may be e.g. CAD or CAM data) is downloaded to the central computer, typically from an external storage device. The inspection requirement data, however, is typically entered by the operator at the command console of the central computer and stored internally. The inspection requirement data specifies the shape characteristics which the operator has selected for inspection.

Next, the blisk is mounted (at 22) on the turntable to determine the orientation and position of the blisk relative to the turntable. This stage, which is known to the skilled person From conventional CMM-controlled inspection procedures, allows the CMM to measure coordinates and move the probe in the frame of reference of the blisk. Thus, for example, if the blisk has a timing slot, the operator may use the slot to fix the position of a set of coordinate axes in the reference frame of the blisk.

The blisk is then inspected (at 23) by running the inspection program to control the movement of the measuring probe. This provides actual coordinate measurements for selected shape characteristics.

The measurements are compared with tolerance limits for the shape characteristics at 24, allowing a determination at 25) as to whether the blisk conforms to requirements.

Figure 4:
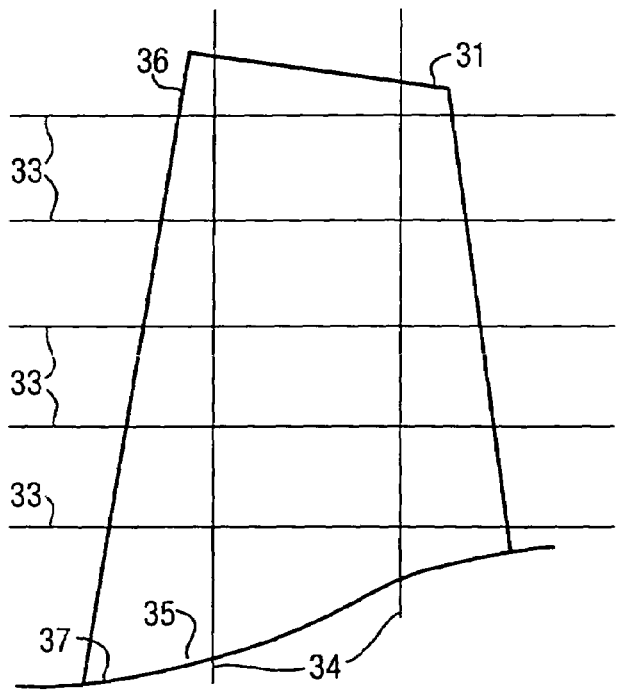
FIG. 4 shows schematically a side-on view of a blisk blade and the outer radial surface of the blisk disk to which the blade is attached.

We now discuss, in more detail, stage 21—i.e. automatic generation of the inspection program. The starting point for this discussion is the definitions of the shape characteristics. FIG. 4 shows schematically a side-on view of a blisk blade 31 extending from the outer radial surface the blisk disk to which the blade is attached.

Five plane sections 33 at different distances from the blade root 35, two longitudinal sections 34 at different distances from the blade leading edge 36, and an annular section 37 which profiles the radially outer surface of a disk are indicated.

Figure 5:
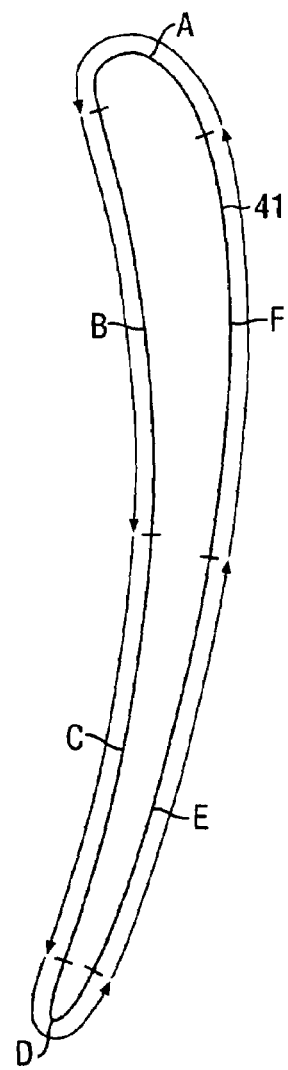
FIG. 5 shows schematically the profile of a plane section of a blisk blade, FIGS. 6a and b show schematically how a specified direction can be determined by the orientation of a plane section relative to the blisk.

A standard measuring probe inspection path can be associated with each of these shape characteristics. FIG. 5 shows, as an example, the profile 41 of a plane section. probe inspection path is broken up into a number of sub-paths A to F, the start and stop points of the sub-paths being indicated by transverse dashes on the profile. The direction of probe movement for each sub-path is indicated by the respective arrow.

The sub-paths provide programming flexibility. For example, the spacing between adjacent blades may be such that the probe cannot continuously circumnavigate around the blisk. However, this problem is overcome when the central computer imposes the requirement that sub-paths F, A and B be approached from the one side of the blisk and sub-paths C, D and E from the other side of the blisk, the probe being reorientated before completing sub-paths C, D and E.

Also different coordinate measurement point densities can be associated with different sub-paths. For example, it is usually important for sub-paths associated with the leading and trailing edges of the blade (where the blade surface curvature is generally high) to have high measuring point densities in order to provide accurate representations of the shapes of the leading and trailing edges. Thus a higher coordinate measurement point density can be specified for sub-paths A and D than for sub-paths B, C, E and F.

The central computer can further require that sub-paths B, C, E and F be measured with a longer measuring probe than sub-paths A and D. This can improve access to the flanks of the blade without compromising the measurement accuracy at the leading and trailing edges.

A default setting may, therefore, be specified whereby each sub-path is to be measured using the respective direction of approach, a long measuring probe, and a standard density of measuring points. The default setting should enable the profile of any plane section of any blisk to be inspected.

The precise start and stop positions of each sub-path cannot be provided by the nominal geometry data as these positions are only determined following inspection. However, using the nominal geometry data and the inspection requirement data (which specifies which particular plane section is to be measured—i.e. the distance from the blade root) the central computer calculates adjacent safe stand-off positions for the probe for each start/stop position. Each stand-off position is set a sufficient distance away from the respective start/stop position such that there is no possibility of the probe contacting the blisk at the stand-off position. On the other hand, each stand-off position should be only a short probe movement away from the start/stop position. In practice, an optimum stand-off distance, which represents an acceptable compromise between these two criteria, can be determined from past experience of the variability in the dimensions of previously inspected blisks. This stand-off distance may then be set as the default, with the operator having the facility to modify or override the default if necessary.

To move the measuring probe along a particular sub-path, the CMM drives the probe to the stand-off position adjacent the start position for the path. The probe is then switched over to scanning mode and moves forward until it engages the blade. Next the probe scans along the blade surface in the appropriate (clockwise or anticlockwise direction), taking coordinate measurements along the way, and heading towards the stop position. Such scanning is known from conventional CMM Procedures. For example, if a Renishaw Sp600™ measuring probe is used, an analogue scanning mode may be adopted. When the probe reaches a position (the stop position) on the blade adjacent the other stand-off position for the sub-path it pulls away to the other stand-off position (so that it is longer contacts the blade) and the inspection of the sub-path is complete.

The sub-paths should form a continuous profile so that no uninspected gaps are formed between the sub-paths. To ensure this, for each plane section the central computer requires the probe to move between stand-off and start/stop positions along a specified engagement/disengagement direction. In this way the probe "knows" e.g. that it has reached the stop position when it arrives at a point lying on a vector which passes through the corresponding stand-off position and which is parallel to the engagement/disengagement direction.

Figure 6A:
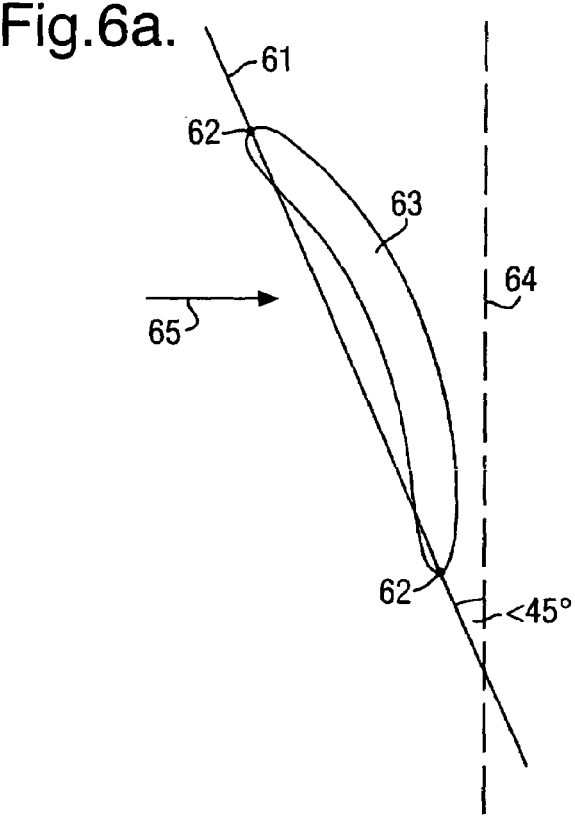
Figure 6B:
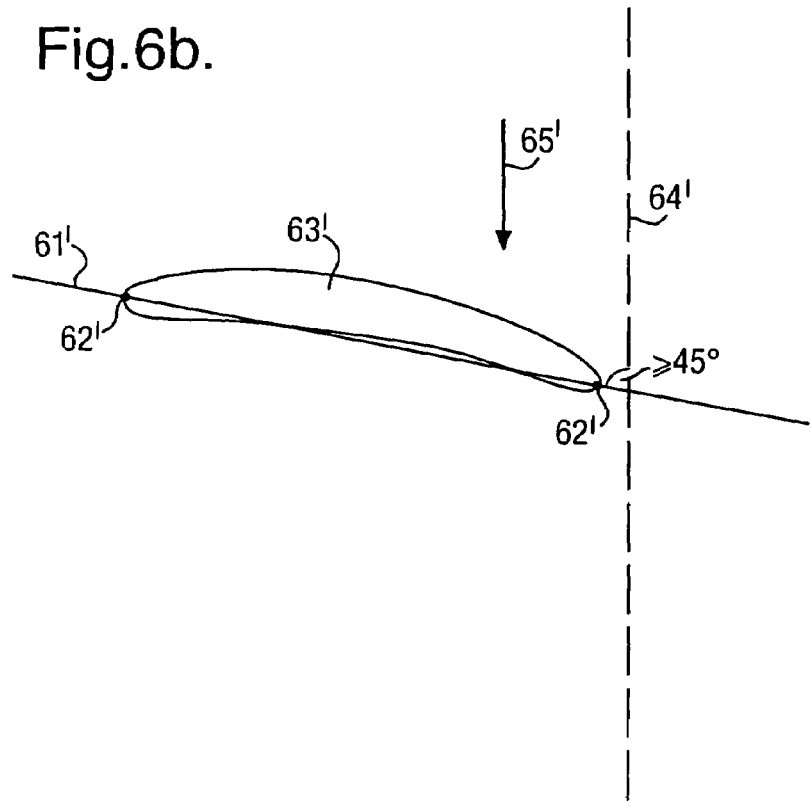

FIGS. 6a and b show schematically how the engagement/disengagement direction can conveniently be determined by the orientation of the plane section relative be the blisk. With reference to FIG. 6a, if the line 61 between the leading and trailing edge end points 62 of the plane section 63 forms an angle of less then 45° with the axis 64 of the blisk disk, the engagement/disengagement direction 65 can be set to be in the plane of the plane section and perpendicular to the axis. Conversely, and with reference to FIG. 6b, if the line 61' between the leading and trailing edge end points 62' of the plane section 63' forms an angle of 45° or more than 45° with the axis 64' of the blisk disk, the engagement/disengagement direction 65' can be set to be parallel to the axis.

To further ensure that a continuous profile is formed, the sub-paths may also overlap to a small extent. This can be implemented by off-setting the start and stop points of each sub-path a small amount in a direction perpendicular to the specified direction (and in the plane of the section) in such a way that the length of the sub-path is increased at each end thereof.

FIG. 7 shows schematically another plane section, which like the plane section or FIG. 5, has inspection sub-paths A–F. Start/stop positions are indicated by transverse dashes on the profile formed by the plane section. Stand-off positions are associated with the start and stop positions of each sub-path, as described in Table 1.

TABLE 1

| Sub-path | Stand-off positions |
|---|---|
| A | T4, T5 |
| B | T5, S1 |
| C | S1, B4 |
| D | B4, B5 |
| E | B5, S3 |
| F | S3, T4 |

The arrow indicates the engagement/disengagement direction along which the probe moves between stand-off and start/stop positions.

Further measuring probe positions, T3, T6, S2, B3, B6, and S4, allow the probe to exit from a respective stand-off position and retreat to a respective safe position, T0, T7, B0 or B7, at which the probe can be reorientated without risk of collision with the blisk. Each safe position is on the opposite side of one of two virtual clearance planes 51, 52 which extend perpendicularly to the axis 53 of the blisk disk and which are spaced from respectively the fluid inlet or fluid outlet face of the disk.

To exit from stand-off position T5 to a safe position, the probe executes the movement T5→T6→T7. Table 2 describes the corresponding movement for the other stand-off positions.

TABLE 2

| Stand-off position | Movement to safe position |
|---|---|
| T4 | T4→T3→T0 |
| T5 | T5→T6→T7 |
| S1 | S1→S2→T6→T7 or |
|    | S1→S2→B3→B0 |
| B4 | B4→B3→B0 |
| B5 | B5→B6→B7 |
| S3 | S3→S4→B6→B7 or |
|    | S3→S4→T3→T0 |

The positions T3, T6, S2, B3, B6, and S4 are calculated by the central computer from the nominal data and inspection requirement data such that the measuring probe can move to the safe positions without hitting the leading and trailing edges of the blade.

Safe positions can be used when the probe has completed sub-paths on one side of the blisk and requires reorientation before it can scan sub-paths on the other side of the blisk. For example, after scanning sub-paths A, B and F, the probe exits to T0 where it is reorientated. The probe is than moved from the inlet face side of the blisk to the outlet face side (along a predefined "safe" path avoiding the blisk, and positioned at B0 ready to scan sub-paths C, D and E.

Thus merely bow providing the nominal data and inspection requirement data go the central computer, a sequence or measuring probe movements are generated which scan the probe around the plane section so that the entire profile of the section is inspected.

If he wants to, the CMM operator can intervene to alter the default settings for the particular plane section of the particular blade. For example, if a plane section at the outer extremity of a blade is measurable by a (more efficient) continuous circumnavigation (there being no risk at such an extremity of the probe colliding with adjacent blades), operator may override the default settings and allow successive inspection of sub-paths A–F without exiting the probe to a safe position for reorientation halfway through the inspection. The operator could also intervene to merge sub-paths so that e.g. sub-paths B and C, or E an F are executed without the probe moving away to a standoff position midway through the execution.

Figure 8:
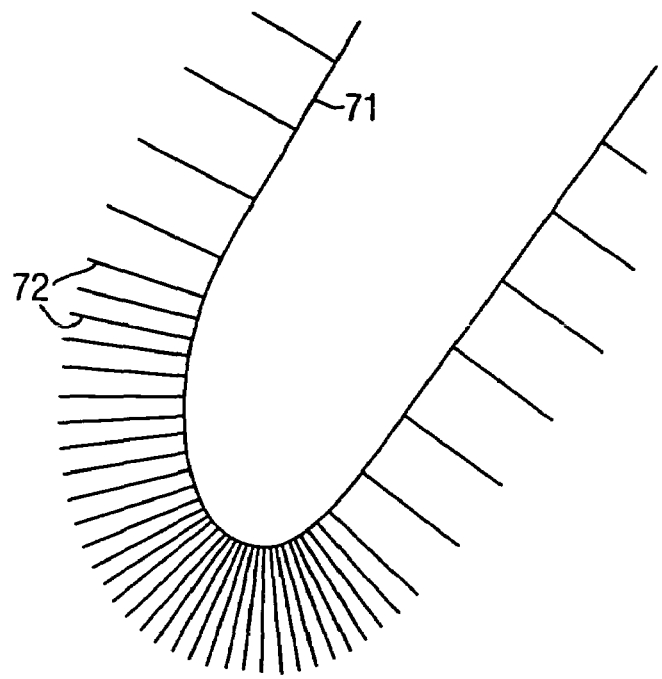

The CMM operator may also specify e.g. different measurement point densities and probe lengths for different sub-paths. For example, high measurement point densities and short probes are generally desirable for scanning along sub-paths which include leading or trailing edges. Probe changes, to enable the CMM to switch between e.g. long and short probe lengths, can be performed automatically by moving the probe from a safe position to the probe change station 6 before the continuing with the scan. Such movements are controlled by standard routines which are permanently stored in the central computer. FIG. 8 shows schematically a portion 71 of a plane section profile. Each transverse line 72 represents the position of one coordinate position measurement on the profile. The measurement density has been increased for the critical the leading edge section of the profile.

Figure 9:
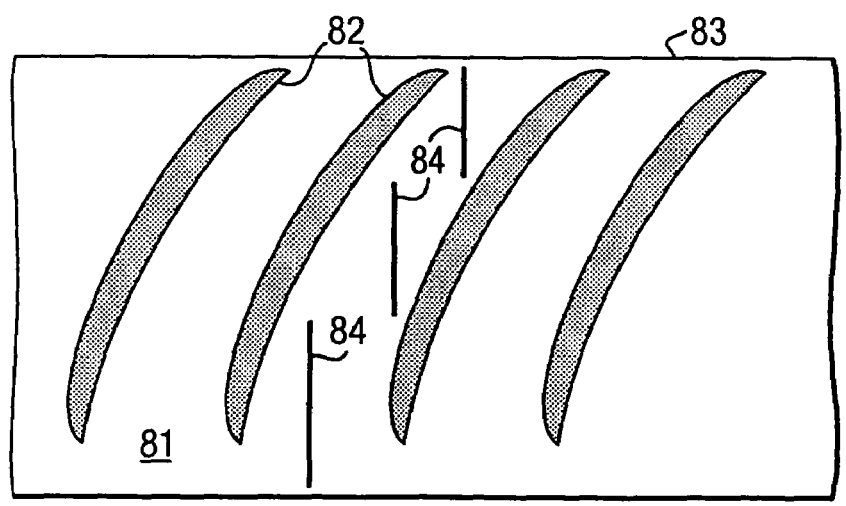
FIG. 9 shows schematically a view of a portion of the outer radial face of a disk.

Similar considerations (i.e. sub-paths, probe movement directions, measurement point densities, stand-off positions, safe positions, engagement/disengagement directions, sub-path overlaps) apply to the other shape characteristics discussed above in relation to FIG. 4. For example, in respect of a longitudinal section the standard measuring probe inspection path may run from the top of the blade down to the intersection of the blade root fillet with the outer radial surface of the disk. Such a path may have two sub-paths: one running down the flank of the blade and the other at the root radius where a higher data point density is generally required. In respect of an annular section, when the angle of the blades does not allow a single annular section profile to extend uninterrupted from the inlet to the outlet face of a disk on the radially outer surface of the disk, a plurality of axially consecutive and angularly staggered annular sections may be inspected instead, each of which can be considered a sub-path. FIG. 9 shows schematically a view of a portion 81 of the outer radial face of a disk with a number of blades 82 extending out of the plane of the paper. An annular section profile extending from the inlet face 83 of the disk would eventually run into one of the blades. However, scanning a plurality of angularly staggered, but axially consecutive, annular sections 84 allows a full profile to be inspected.

Figure 10:
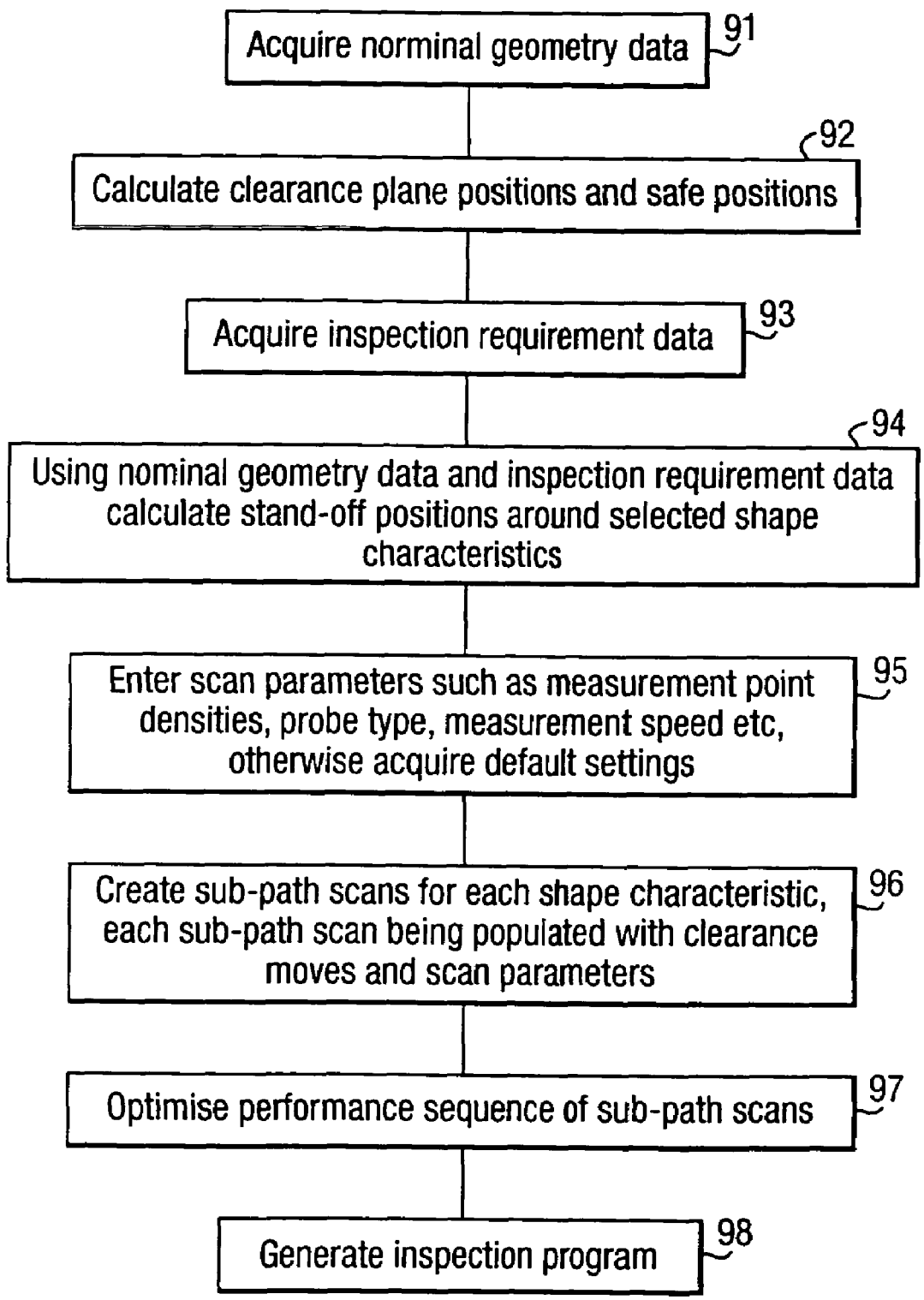
FIG. 10 is a flowchart which shows schematically the stages involved in the generation an inspection program by the central computer.

FIG. 10 is a flowchart which shows schematically the stages involved in the generation of an inspection program by the central computer (i.e. stage 21 of FIG. 3).

At step 91 the central computer acquires the nominal geometry data and from this (step 92) calculates the clearance plane positions and probe safe positions. Next at step 93, the central computer acquires the inspection requirement data which specifies the selected shape characteristics (e.g. plane sections, longitudinal sections, annular sections etc.). Using the nominal geometry data and the inspection requirement data the central computer calculates (at step 94) the stand-off positions around the selected shape characteristics. At step 95, the operator can then enter scan parameters such as a measurement point densities, probe type, measurement speed for particular shape characteristics (or sub-paths thereof), but otherwise default settings are acquired.

Although the entry of the scan parameters is shown as a separate step, effectively these parameters form part of the inspection requirement data.

The central Computer now has sufficient information to create sub-path scan program segments for each selected shape characteristic and to populate each program segment with clearance moves and scan parameters. This is shown at step 96. Subsequently (at step 97), the central computer optimises the order of performance of the program segment so that e.g. all sub-path scans using a particular probe are performed before the probe is changed. Other optimisation strategies may be specified by the operator. Finally, the ordered program segments are combined to generate the inspection program (step 98).

Thus, the degree of operator involvement in the generation of the inspection program can vary. In a fully automated procedure the operator allows the central computer to determine all clearance moves and scan parameters. In a partially automated procedure he intervenes to a greater or lesser extent to override the default settings.

The inspection program can then be used to inspect the blisk and to generate a set of coordinate measurements for the selected shape characteristics, as discussed above with reference to FIG. 3. Although the coordinate measurements are obtained using an inspection program generated according to the present invention, the measurements themselves may be in a conventional component inspection data format. They may be stored on an internal or external data storage device for subsequent analysis.

Figure 11:
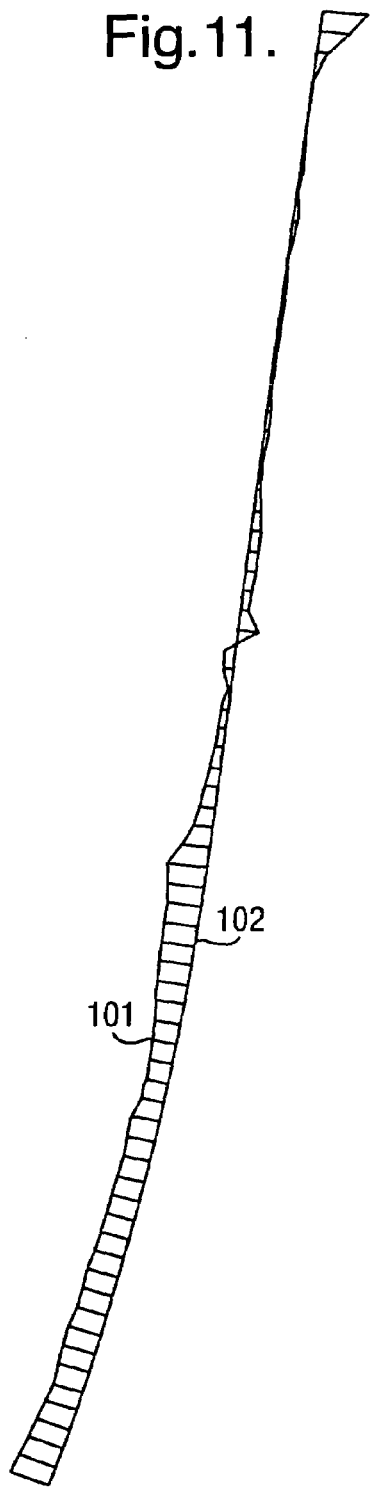
FIG. 11 shows an example of coordinate measurements obtained for an annular section.

FIG. 11 shows an example of coordinate measurements obtained for an annular section. The coordinate measurements form a profile 101 which is superimposed on the nominal profile 102. Deviations of the measured profile from the nominal profile are expanded by a scale factor to make differences visible to the viewer.

Figure 12:
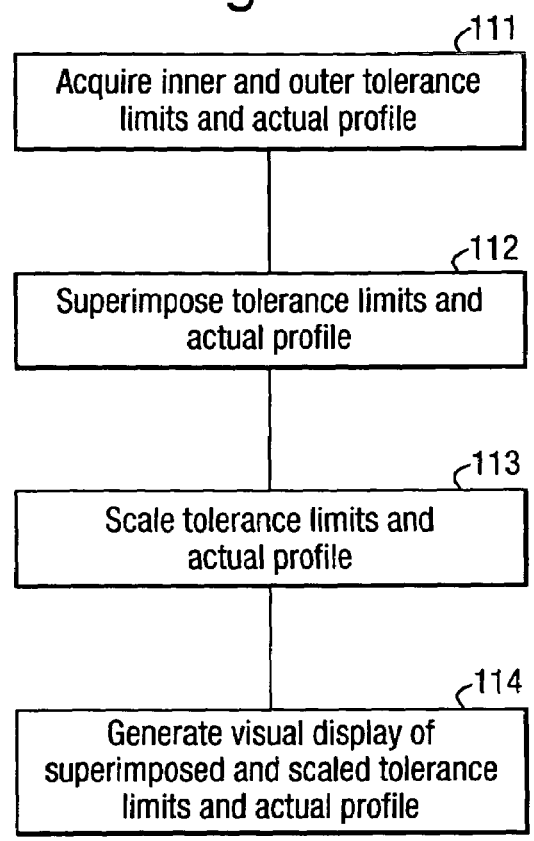
FIG. 12 is a block diagram of an exemplary procedure for forming a visual display.

The coordinate measurements are used to determine whether the blisk conforms to tolerance (i.e. step 25 of FIG. 3), and the present invention provides a method of generating a visual display for comparing an actual (e.g. measured) profile of a component with spaced inner and outer tolerance limits for the profile. FIG. 12 is a block diagram of an exemplary procedure for performing this method. In FIG. 12 the procedure is applied to a blisk, but of course it may be applied to other components as well. The exemplary procedure uses the central computer 4 of FIG. 1, but other computer systems may equally be used.

At step 111 of FIG. 12 the central computer acquires the inner tolerance limit, the outer tolerance limit, and the actual profile from respective data storage devices. The tolerance limits and the actual profile are then superimposed by the central computer (step 112). Next, at step 113 the tolerance limits and the actual profile are scaled by outwardly displacing the outer tolerance limit and actual profile without displacing the inner tolerance limit in the opposite direction, so that the spacing (i.e. distances) between the inner and outer tolerance limits is increased relative to distances along which the actual profile extends, but the position of the actual profile relative to the spacing is preserved. Thus if a particular point on the actual profile is midway between the tolerance limits, after scaling the point should still be midway between the limits. Finally, at step 114 a visual display is generated of the superimposed and scaled tolerance limits and actual profile. The display is conveniently formed on a VDU unit of the command console, but may be printed out.

The effect of the scaling is to make small differences between the tolerance limits and actual profile visible, so that it is easy to determine whether the blisk conforms to requirements.

Figure 13:
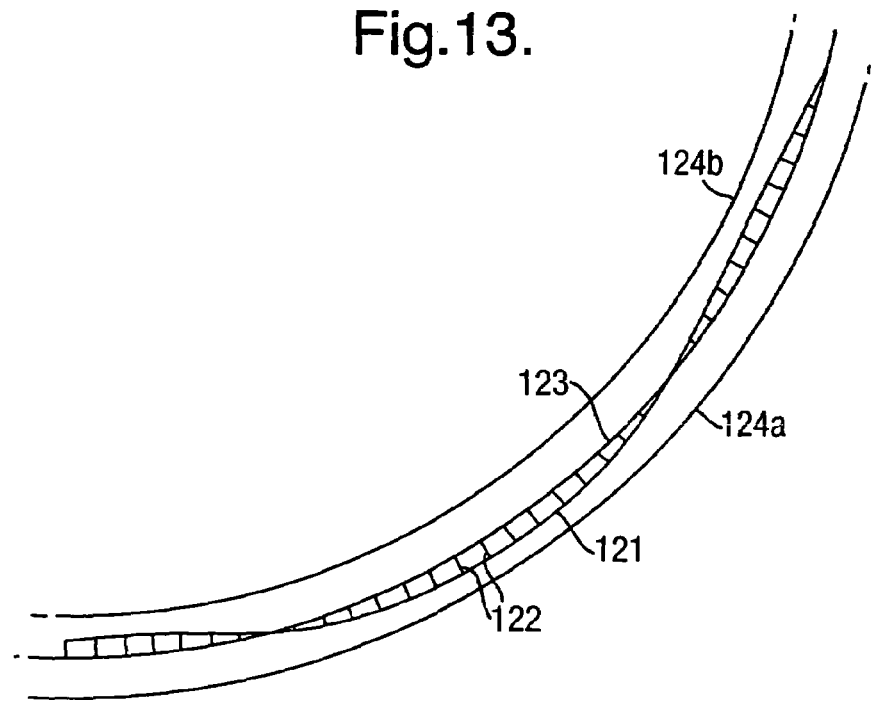
FIG. 13 is a visual display of the blade root portion of a longitudinal section profile formed using the procedure of FIG. 12.

FIG. 13 is a visual display of the blade root portion of a measured longitudinal section profile formed using the procedure. The display includes the nominal profile as well as the actual profile and tolerance limits. The actual profile 121 is connected by transverse lines 122 to the nominal profile 123. Each transverse line corresponds to the position of a measured coordinate. The tolerance limits 124*a* and 124*b* are to either side of the actual profile. Because distances between the inner and outer tolerances have been expanded relative to distances along the measured profile, it is immediately evident to the viewer that the actual profile does not touch or cross the tolerance limits and so a viewer of the display can swiftly determine that this part of the blisk conforms to tolerance. Without this expansion the viewer would not be able to distinguish the tolerance limits (which are spaced to either side of the nominal profile by a distance of about 0.03–0.30 mm compared to a blade root radius of about 3.0–8.0 mm from the actual profile on the display.

Figure 14:
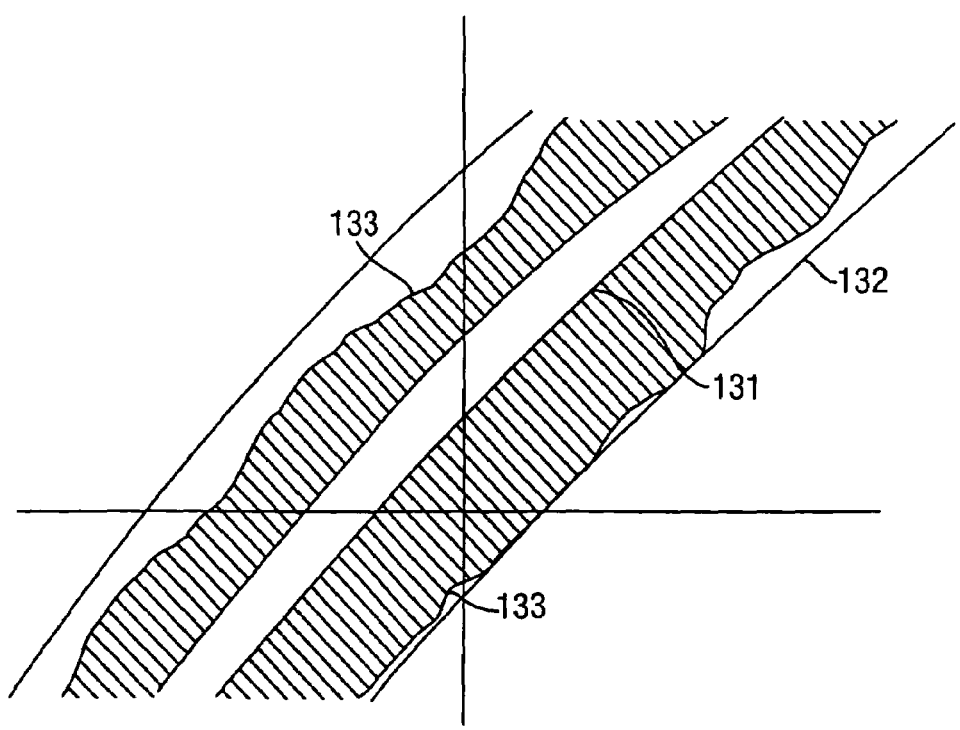
FIG. 14 is a visual display of the blade flank portions of a plane section profile formed using the procedure of FIG. 12.

FIG. 14 is a further example of a visual display. The display shows the blade flank portions of a measured plane section profile. In reality the blade flanks are about 20–300 mm long, and the tolerance limits are spaced to either side of the nominal profile by a distance of about 0.03–0.30 mm. As the increased spacing between the inner 131 and outer 132 tolerance limits on the display has been effected by expanding the outer tolerance limit and not shrinking the inner tolerance limit, crossing over of opposing flanks of the inner tolerance limit is avoided. The viewer can readily observe that on one flank the actual profile 133 touches the outer tolerance limit 132 at several points, indicating that the blade does not conform to tolerance.

While the invention has been described in conjunction with the exemplary embodiments described above, many equivalent modifications and variations will be apparent to those skilled in the art when given this disclosure. Accordingly, the exemplary embodiments of the of the invention set forth above are considered to be illustrative and not limiting. Various changes to the described embodiments may be made without departing from the spirit and scope of the invention.

The invention claimed is:

1. A computer-implemented method of generating an inspection program for a computer-controlled coordinate measuring probe, the method comprising the steps of:
    (a) receiving nominal geometry data for a component,
    (b) receiving inspection requirement data specifying one Or more selected shape characteristics of the component,
    (c) determining from the nominal geometry data and the inspection requirement data an inspection path for a computer-controlled coordinate measuring probe, the inspection path enabling the measuring probe to measure actual component coordinates associated with the selected shape characteristics, and
    (d) generating an inspection program for moving the computer-controlled coordinate measuring probe along the inspection path,
    wherein before step (c) the step of determining from the nominal geometry data at least one probe position at which the probe can be reorientated without risk of collision with the component is performed.

2. A method of generating an inspection program according to claim 1, wherein the inspection path is determined so as to minimise the number of probe changes.

3. A method of generating an inspection program according to claim 1, wherein the component is a gas turbine component.

4. Computer readable program code for implementing the method of claim 1.

5. Computer readable media carrying program code implementing the method of claim 3.

6. A computer system for implementing the method of claim 3.

7. Computer readable inspection program code generated by performing the method of claim 3.

8. Computer readable media carrying inspection program code generated by performing the method of claim 3.

9. A method of inspecting a component with a coordinate measuring probe, the method comprising the steps of:
  (a) receiving nominal geometry data for the component,
  (b) receiving inspection requirement data specifying one or more selected shape characteristics of the component,
  (c) determining from the nominal geometry data and the inspection requirement data an inspection path for the coordinate measuring probe, the inspection path enabling the measuring probe to measure actual component coordinates associated with the shape characteristics, and
  (d) inspecting the component by moving the coordinate measuring probe along the inspection path,
  wherein before step (c) the step of determining from the nominal geometry data at least one probe position at which the probe can be reorientated without risk of collision with the component is performed.

10. A method of generating an inspection program according to claim 9, wherein the inspection path is determined so as to minimise the number of probe changes.

11. A method of generating an inspection program according to claim 9, wherein the component is a gas turbine component.

12. A method of generating a visual display for comparing an actual profile of a component with spaced inner and outer tolerance limits for the profile, the method comprising the steps of:
  (a) superimposing the inner tolerance limit, the outer tolerance limit, and the actual profile,
  (b) scaling the tolerance limits and actual profile by displacing each point on one of the tolerance limits in a displacement direction away from the corresponding point on the other tolerance limit without displacing said corresponding point in the opposite direction, and furthermore displacing each point on the actual profile in said displacement direction, so that the spacing between the inner and outer tolerance limits is increased relative to distances along which the actual profile extends, but the position of the actual profile relative to said spacing is preserved, and
  (c) generating a visual display of the superimposed and scaled tolerance limits and actual profile.

13. Computer readable program code imuiementing toe method of claim 12.

14. Computer readable media carrying program code for implementing the method of claim 12.

15. A computer system for implementing the method of claim 12.

16. A method of determining whether a component conforms to tolerances, the method comprising the step=or:
  (a) providing an actual profile of a component, and spaced inner and outer tolerance limits for the profile
  (a) superimposing the inner tolerance limit, the outer tolerance limit, and the actual
  (b) scaling the tolerance limits and actual profile by displacing each pain: on one of the tolerance limits in a displacement direction away from the corresponding point on the other tolerance limit without displacing said corresponding point in the opposite direction, and furthermore displacing each point on the actual profile in said displacement direction, so that the spacing between the inner and outer tolerance limits is increased relative to distances along which the actual profile extends, but the position of the actual profile relative to said spacing is preserved,
  (c) generating a visual display of the superimposed and scaled tolerance limits and actual profile, and
  (d) determining from the visual display whether the actual profile is between the inner and outer tolerance limits.

* * * * *